United States Patent
Diab et al.

(10) Patent No.: US 8,571,063 B2
(45) Date of Patent: Oct. 29, 2013

(54) METHOD AND SYSTEM FOR CONFIGURABLE DATA RATE VIA INTER-PACKET GAP ADJUSTMENT TO SUPPORT ENERGY EFFICIENT NETWORKS

(75) Inventors: Wael William Diab, San Francisco, CA (US); Patricia Ann Thaler, Carmichael, CA (US)

(73) Assignee: Broadcom Corporation, Irvine, CA (US)

( * ) Notice: Subject to any disclaimer, the term of this patent is extended or adjusted under 35 U.S.C. 154(b) by 695 days.

(21) Appl. No.: 12/119,278

(22) Filed: May 12, 2008

(65) Prior Publication Data

US 2009/0097481 A1    Apr. 16, 2009

Related U.S. Application Data

(60) Provisional application No. 60/979,433, filed on Oct. 12, 2007.

(51) Int. Cl.
*H04J 3/16* (2006.01)

(52) U.S. Cl.
CPC .......................................... *H04J 3/16* (2013.01)
USPC ........................................................ 370/468

(58) Field of Classification Search
None
See application file for complete search history.

(56) References Cited

U.S. PATENT DOCUMENTS

| | | | |
|---|---|---|---|
| 5,381,450 A | | 1/1995 | Lane |
| 5,541,957 A | * | 7/1996 | Lau ................................ 375/258 |
| 5,642,360 A | * | 6/1997 | Trainin .......................... 370/230 |
| 5,668,857 A | * | 9/1997 | McHale ...................... 379/93.07 |
| 6,058,114 A | * | 5/2000 | Sethuram et al. ............. 370/397 |
| 6,085,248 A | | 7/2000 | Sambamurthy et al. |
| 6,108,306 A | * | 8/2000 | Kalkunte et al. .............. 370/235 |
| 6,246,694 B1 | * | 6/2001 | Chen ............................. 370/468 |

(Continued)

FOREIGN PATENT DOCUMENTS

| | | |
|---|---|---|
| EP | 1 473 870 | 11/2004 |
| EP | 1484876 | 12/2004 |

(Continued)

OTHER PUBLICATIONS

Bennett et al., "Energy Efficient Ethernet", [Online] IEEE 802 Tutorial, Jul. 16, 2007, http://www.ieee802.org/802_tutorials/july07/IEEE-tutorial-energy-efficient-ethernet.pdf.

(Continued)

*Primary Examiner* — Timothy J Weidner
(74) *Attorney, Agent, or Firm* — Duane S. Kobayashi

(57) ABSTRACT

Aspects of a method and system for programmable data rate thresholds for configurable data rate via inter-packet gap adjustment to support energy efficient networks. In this regard, an inter-packet gap may be adjusted to control a data rate on an Ethernet link. An IPG may be adjusted such that a data rate on a network link may be communicated at a non-standardized rate suited to an audio and/or video stream. An IPG may be adjusted such that data is communicated over the link at a standardized rate. In this regard, adjusting the IPG may compensate for a non-standardized data rate resulting from altering other parameters of the link. The IPG may be adjusted based on a control policy which may govern data rates on a network link. Each of a plurality of inter-packet gaps may be differently adjusted to achieve a desired average data rate on the link.

27 Claims, 5 Drawing Sheets

(56) References Cited

U.S. PATENT DOCUMENTS

| | | | |
|---|---|---|---|
| 6,307,839 B1* | 10/2001 | Gerszberg et al. | 370/468 |
| 6,442,174 B1 | 8/2002 | Lin | |
| 6,483,870 B1* | 11/2002 | Locklear et al. | 370/468 |
| 6,587,473 B2 | 7/2003 | Terry et al. | |
| 6,731,692 B1 | 5/2004 | Bhoja | |
| 6,795,450 B1 | 9/2004 | Mills et al. | |
| 6,856,597 B1 | 2/2005 | Scott | |
| 6,868,072 B1* | 3/2005 | Lin et al. | 370/276 |
| 6,907,048 B1* | 6/2005 | Treadaway et al. | 370/474 |
| 7,095,737 B2* | 8/2006 | Lo | 370/389 |
| 7,492,710 B2* | 2/2009 | Wadekar et al. | 370/230 |
| 7,548,694 B2* | 6/2009 | Kazawa et al. | 398/67 |
| 7,574,594 B2* | 8/2009 | Winter | 713/151 |
| 7,719,966 B2* | 5/2010 | Luft et al. | 370/230.1 |
| 7,809,021 B2* | 10/2010 | McClellan | 370/476 |
| 7,869,360 B2* | 1/2011 | Shi | 370/231 |
| 8,160,089 B1* | 4/2012 | Padiyar et al. | 370/445 |
| 8,228,795 B2* | 7/2012 | Conway et al. | 370/230.1 |
| 2001/0033611 A1 | 10/2001 | Grimwood | |
| 2001/0038641 A1* | 11/2001 | Fujimori et al. | 370/468 |
| 2002/0057713 A1* | 5/2002 | Bagchi et al. | 370/468 |
| 2002/0136231 A1 | 9/2002 | Leatherbury | |
| 2003/0053493 A1 | 3/2003 | Graham Mobley | |
| 2003/0191854 A1 | 10/2003 | Hsu | |
| 2004/0218531 A1* | 11/2004 | Cherian et al. | 370/235 |
| 2006/0034295 A1 | 2/2006 | Cherukuri et al. | |
| 2006/0092826 A1* | 5/2006 | Karam et al. | 370/216 |
| 2006/0109784 A1* | 5/2006 | Weller et al. | 370/229 |
| 2006/0140218 A1 | 6/2006 | Winterton | |
| 2006/0153238 A1* | 7/2006 | Bar-On et al. | 370/473 |
| 2006/0218422 A1* | 9/2006 | Camagna et al. | 713/300 |
| 2007/0127581 A1 | 6/2007 | Connor | |
| 2007/0280239 A1 | 12/2007 | Lund | |
| 2008/0056284 A1* | 3/2008 | Powell et al. | 370/401 |
| 2008/0069014 A1* | 3/2008 | Powell et al. | 370/278 |
| 2008/0201626 A1 | 8/2008 | Sturm | |
| 2008/0225841 A1 | 9/2008 | Conway et al. | |
| 2008/0311865 A1* | 12/2008 | Worfolk et al. | 370/336 |
| 2008/0313508 A1 | 12/2008 | Starr | |
| 2009/0028050 A1* | 1/2009 | Winter | 370/236 |
| 2009/0059948 A1* | 3/2009 | Stueve | 370/445 |
| 2009/0097427 A1 | 4/2009 | Diab | |
| 2009/0097442 A1 | 4/2009 | Diab | |
| 2009/0097481 A1 | 4/2009 | Diab | |
| 2009/0097500 A1 | 4/2009 | Diab | |
| 2009/0154355 A1 | 6/2009 | Diab | |
| 2009/0154455 A1 | 6/2009 | Diab | |
| 2009/0154490 A1 | 6/2009 | Diab | |
| 2009/0154500 A1 | 6/2009 | Diab | |
| 2009/0154593 A1 | 6/2009 | Diab | |
| 2009/0157865 A1* | 6/2009 | Winter | 709/224 |
| 2009/0225773 A1* | 9/2009 | Winter | 370/437 |
| 2011/0176447 A1* | 7/2011 | Elzur et al. | 370/252 |
| 2011/0249686 A1* | 10/2011 | Langner et al. | 370/465 |

FOREIGN PATENT DOCUMENTS

| | | |
|---|---|---|
| EP | 1 494 407 | 1/2005 |
| GB | 2337672 | 11/1999 |
| WO | WO 00/31923 | 6/2000 |

OTHER PUBLICATIONS

Grow, "802.1 and Energy Efficient Ethernet", [Online] Sep. 11, 2007, pp. 1-6, http://www.ieee802.org/3/eee_study/public/sep07/grow_1_0907.pdf.

Teener, "Audio/Video Bridging for Home Networks (IEEE 802.1 AV Bridging Task Group)" [Online] Jun. 1, 2007, http://www.ieee802.org/3/eee_study/public/jul07/teener_1_0707.pdf.

Gupta et al., "Dynamic Ethernet Link Shutdown for Energy Conservation on Ethernet Links." IEEE, Jun. 24, 2007. XP002524616.

Wael Diab, "Energy Efficient Ethernet and 802.1." Nov. 2007. XP002524617.

* cited by examiner

METHOD AND SYSTEM FOR CONFIGURABLE DATA RATE VIA INTER-PACKET GAP ADJUSTMENT TO SUPPORT ENERGY EFFICIENT NETWORKS

CROSS-REFERENCE TO RELATED APPLICATIONS/INCORPORATION BY REFERENCE

This patent application makes reference to, claims priority to and claims benefit from U.S. Provisional Patent Application Ser. No. 60/979,433 filed on Oct. 12, 2007.

The above stated application is hereby incorporated herein by reference in its entirety.

FIELD OF THE INVENTION

Certain embodiments of the invention relate to networking. More specifically, certain embodiments of the invention relate to a method and system for configurable data rate via inter-packet gap adjustment to support energy efficient networks.

BACKGROUND OF THE INVENTION

With the increasing popularity of electronics such as desktop computers, laptop computers, and handheld devices such as smart phones and PDA's, communication networks, and in particular Ethernet networks, are becoming an increasingly popular means of exchanging data of various types and sizes for a variety of applications. In this regard, Ethernet networks are increasingly being utilized to carry, for example, voice, data, and multimedia. Accordingly more and more devices are being equipped to interface to Ethernet networks.

As the number of devices connected to data networks increases and higher data rates are required, there is a growing need for new transmission technologies which enable higher data rates. Conventionally, however, increased data rates often results in significant increases in power consumption. In this regard, as an increasing number of portable and/or handheld devices are enabled for Ethernet communications, battery life may be a concern when communicating over Ethernet networks. Accordingly, ways of reducing power consumption when communicating over Ethernet networks may be needed.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for configurable data rate via inter-packet gap adjustment to support energy efficient networks, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for configurable data rate via inter-packet gap adjustment to support energy efficient networks. In this regard, an inter-packet gap may be adjusted to control a data rate on an Ethernet link. An IPG may be adjusted such that a data rate on a network link may be communicated at a non-standardized rate suited for an audio and/or video stream. Also, an IPG may be adjusted such that data is communicated over the link at a standardized rate. In this regard, adjusting the IPG may compensate for a non-standardized data rate resulting from altering other parameters of the link. The IPG may be adjusted based on a control policy which may govern data rates on a network link. For example, the IPG may be adjusted based on past, present, and/or expected traffic on the link; based on a type of traffic; and/or based on an application associated with the traffic on the link. Each of a plurality of inter-packet gaps may be differently adjusted to achieve a desired average data rate on the link.

Figure 1:
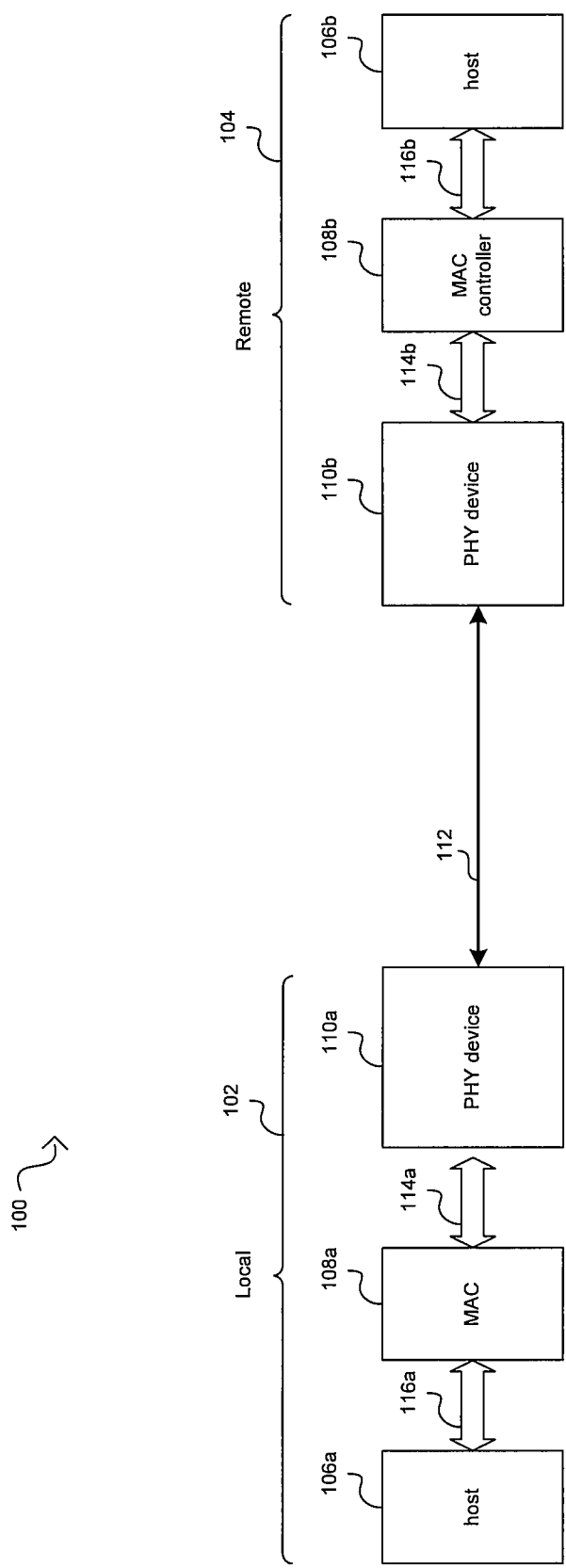
FIG. 1 is a block diagram illustrating an Ethernet connection between a local link partner and a remote link partner, in accordance with an embodiment of the invention.

FIG. 1 is a block diagram illustrating an Ethernet connection between a local link partner and a remote link partner, in accordance with an embodiment of the invention. Referring to FIG. 1, there is shown a system 100 that comprises a local link partner 102 and a remote link partner 104. The local link partner 102 and the remote link partner 104 may communicate via a cable 112. The cable 112 may comprise up to four or more physical channels, each of which may, for example, comprise an unshielded twisted pair (UTP). The local link partner 102 and the remote link partner 104 may communicate via two or more physical channels comprising the cable 112. For example, Ethernet over twisted pair standards 10BASE-T and 100BASE-TX may utilize two pairs of UTP while Ethernet over twisted pair standards 1000BASE-T and 10GBASE-T may utilize four pairs of UTP. In this regard, however, aspects of the invention may enable varying the number of physical channels via which data is communicated.

In an exemplary embodiment of the invention, the link partners 102 and/or 104 may comprise a twisted pair PHY capable of operating at one or more standard rates such as 10 Mbps, 100 Mbps, 1 Gbps, and 10 Gbps (10BASE-T, 100GBASE-TX, 1GBASE-T, and/or 10GBASE-T); potentially standardized rates such as 40 Gbps and 100 Gbps; and/or non-standard rates such as 2.5 Gbps and 5 Gbps.

In an exemplary embodiment of the invention, the link partners 102 and/or 104 may comprise a backplane PHY capable of operating at one or more standard rates such as 10 Gbps (10GBASE-KX4 and/or 10GBASE-KR); and/or non-standard rates such as 2.5 Gbps and 5 Gbps.

In an exemplary embodiment of the invention, the link partners 102 and/or 104 may comprise an optical PHY capable of operating at one or more standard rates such as 10

Mbps, 100 Mbps, 1 Gbps, and 10 Gbps; potentially standardized rates such as 40 Gbps and 100 Gbps; and/or non-standardized rates such as 2.5 Gbps and 5 Gbps. In this regard, the optical PHY may be a passive optical network (PON) PHY.

The local link partner 102 may comprise a host 106a, a medium access control (MAC) controller 108a, and a PHY device 104a. The remote link partner 104 may comprise a host 106b, a MAC controller 108b, and a PHY device 110b. Notwithstanding, the invention is not limited in this regard. In various embodiments of the invention, the link partner 102 and/or 104 may comprise, for example, computer systems or audio/video (A/V) enabled equipment. In this regard, A/V equipment may, for example, comprise a microphone, an instrument, a sound board, a sound card, a video camera, a media player, a graphics card, or other audio and/or video device. Additionally, the link partners 102 and 104 may be enabled to utilize Audio/Video Bridging and/or Audio/video bridging extensions (collectively referred to herein as AVB) for the exchange of multimedia content and associated control and/or auxiliary data.

The PHY devices 110a and 110b may each comprise suitable logic, circuitry, and/or code that may enable communication, for example, transmission and reception of data, between the local link partner 102 and the remote link partner 104. The PHY devices 110a and 110b may support, for example, Ethernet over copper, Ethernet over fiber, and/or backplane Ethernet operations. The PHY devices 110a and 110b may enable multi-rate communications, such as 10 Mbps, 100 Mbps, 1000 Mbps (or 1 Gbps), 2.5 Gbps, 4 Gbps, 10 Gbps, or 40 Gbps, for example. In this regard, the PHY devices 110a and 110b may support standard-based data rates and/or non-standard data rates. Moreover, the PHY devices 110a and 110b may support standard Ethernet link lengths or ranges of operation and/or extended ranges of operation. The PHY devices 110a and 110b may enable communication between the local link partner 102 and the remote link partner 104 by utilizing a link discovery signaling (LDS) operation that enables detection of active operations in the other link partner. In this regard the LDS operation may be configured for supporting a standard Ethernet operation and/or an extended range Ethernet operation. The PHY devices 110a and 110b may also support autonegotiation for identifying and selecting communication parameters such as speed and duplex mode.

In various embodiments of the invention, the PHY devices 110a and 110b may comprise suitable logic, circuitry, and/or code that may enable transmission and/or reception at a high(er) data in one direction and transmission and/or reception at a low(er) data rate in the other direction. For example, the local link partner 102 may comprise a multimedia server and the remote link partner 104 may comprise a multimedia client. In this regard, the local link partner 102 may transmit multimedia data, for example, to the remote partner 104 at high(er) data rates while the remote link partner 104 may transmit control or auxiliary data associated with the multimedia content at low(er) data rates. In this regard, the link partners 102 and 104 may control an uplink data rate independent of a downlink data rate and data rate transitions may occur asymmetrically.

The data transmitted and/or received by the PHY devices 110a and 110b may be formatted in accordance with the well-known OSI protocol standard. The OSI model partitions operability and functionality into seven distinct and hierarchical layers. Generally, each layer in the OSI model is structured so that it may provide a service to the immediately higher interfacing layer. For example, layer 1, or physical layer, may provide services to layer 2 and layer 2 may provide services to layer 3. The data transmitted may comprise frames of Ethernet media independent interface (MII) data which may be delimited by start of stream and end of stream delimiters, for example. Exemplary MIIs may comprise gigabit MII (GMII), 10 Gigabit MII (XGMII), Serial Gigabit MII (SGMII), and Reduced Gigabit MII (RGMII).

In an exemplary embodiment of the invention illustrated in FIG. 1, the hosts 106a and 106b may represent layer 2 and above, the MAC controllers 108a and 108b may represent layer 2 and above and the PHY devices 110a and 110b may represent the operability and/or functionality of layer 1 or the physical layer. In this regard, the PHY devices 110a and 110b may be referred to as Physical layer transmitters and/or receivers, physical layer transceivers, PHY transceivers, PHYceivers, or PHY, for example. The hosts 106a and 106b may comprise suitable logic, circuitry, and/or code that may enable operability and/or functionality of the five highest functional layers for data packets that are to be transmitted over the cable 112. Since each layer in the OSI model provides a service to the immediately higher interfacing layer, the MAC controllers 108a and 108b may provide the necessary services to the hosts 106a and 106b to ensure that packets are suitably formatted and communicated to the PHY devices 110a and 110b. During transmission, each layer may add its own header to the data passed on from the interfacing layer above it. However, during reception, a compatible device having a similar OSI stack may strip off the headers as the message passes from the lower layers up to the higher layers.

The PHY devices 110a and 110b may be configured to handle all the physical layer requirements, which include, but are not limited to, packetization, data transfer and serialization/deserialization (SERDES), in instances where such an operation is required. Data packets received by the PHY devices 110a and 110b from MAC controllers 108a and 108b, respectively, may include data and header information for each of the above six functional layers. The PHY devices 110a and 110b may be configured to encode data packets that are to be transmitted over the cable 112 and/or to decode data packets received from the cable 112.

The MAC controller 108a may comprise suitable logic, circuitry, and/or code that may enable handling of data link layer, layer 2, operability and/or functionality in the local link partner 102. Similarly, the MAC controller 108b may comprise suitable logic, circuitry, and/or code that may enable handling of layer 2 operability and/or functionality in the remote link partner 104. The MAC controllers 108a and 108b may be configured to implement Ethernet protocols, such as those based on the IEEE 802.3 standard, for example. Notwithstanding, the invention is not limited in this regard.

The MAC controller 108a may communicate with the PHY device 110a via an interface 114a and with the host 106a via a bus controller interface 116a. The MAC controller 108b may communicate with the PHY device 110b via an interface 114b and with the host 106b via a bus controller interface 116b. The interfaces 114a and 114b correspond to Ethernet interfaces that comprise protocol and/or link management control signals. The interfaces 114a and 114b may be multi-rate capable interfaces and/or media independent interfaces (MII). The bus controller interfaces 116a and 116b may correspond to PCI or PCI-X interfaces. Notwithstanding, the invention is not limited in this regard.

In operation, the link partners 102 and 104 may conventionally transmit data via a fixed number of physical channels at a fixed data rate which may result in network links being underutilized and transmitting IDLE symbols for significant portions of time. In this regard, when the link partners 102 and 104 first establish a connection, they may exchange some preliminary information and/or training signals. In this regard, the link partners 102 and 104 may negotiate a data rate (e.g., 10 Gbps) and duplex mode (e.g., full-duplex) for communicating with each other. Additionally, in order to establish reliable communications, each of the link partners 102 and 104 may need to adjust various parameters, and/or circuitry to account for variables such as the type of cabling over which data is being communicated and the environmental conditions (e.g. temperature) surrounding the cabling. Once the link partners are "trained", they may initially transmit data at 10 Gbps, for example. In this regard, conventional PHY devices may distribute traffic evenly over all available physical channels and may continuously transmit IDLE symbols between packets of actual data (i.e. during inter-packet gaps). However, based, for example, on link utilization, past or present traffic statistics, the type of traffic being transmitted, applications running on the link partner 102 or 104, and/or available resources (e.g., power, buffer space, processor time, etc.), it may be determined that 10 Gbps may be higher than necessary or desired. In this regard, each of the link partners 102 and 104 may comprise suitable logic, circuitry, and/or code for implementing an energy efficient networking control policy. In an exemplary embodiment of the invention, the control policy may be implemented by the MAC controllers 108*a*, 108*b* and/or the hosts 110*a*, 110*b*. Accordingly, the control policy may enable controlling the data rate of the connection between the link partners 102 and 104 to enable the link partners 102 and 104 to communicate in a more energy efficient manner.

In this regard, a low(er) data rate on the link 112 may reduce power consumed on the link 112 and in the link partners 102 and 104. The data rate may be controlled by controlling the inter-packet gap (also referred to as inter-frame gap or IFG). The inter-packet gap (IPG) may be extended to reduce a data rate on a network link and may be reduced to increase a data rate on a network link. In various exemplary embodiments of the invention, the data rate on a link may be altered via various methods such as controlling the number of active physical channels on the link and/or controlling a signal constellation utilized to represent data on the link. In various exemplary embodiments of the invention, methods such as these may result in non-standard data rates on the link. Accordingly, inter-packet gap adjustment may be utilized to fine tune a data rate of a network link such that data on the link is communicated at a standardized rate. In other exemplary embodiments of the invention, IPG adjustment may enable achieving a desired non-standard data rate. For example, a data rate of a multimedia stream may be different from any standardized network data rates and thus IPG adjustment may be utilized to match the data rate on the link to the data rate of the multimedia stream.

In various embodiments of the invention, one or more methods may be utilized on a link to achieve a maximum data rate, a zero data rate, or an intermediate data rate on a network link. In an exemplary embodiment of the invention, one or more channels of the link 112 may convey bursts of data in between periods of inactivity. In this regard, a period of inactivity may correspond to an IPG. For burst transmissions, energy efficiency of the network 100 may be improved by reducing the power required for keeping the channels trained. In this regard, proprietary methods and systems may be utilized during an IPG for transmitting low energy link pulses and/or periods of silence on one or more physical channels of a network link.

Figure 2:
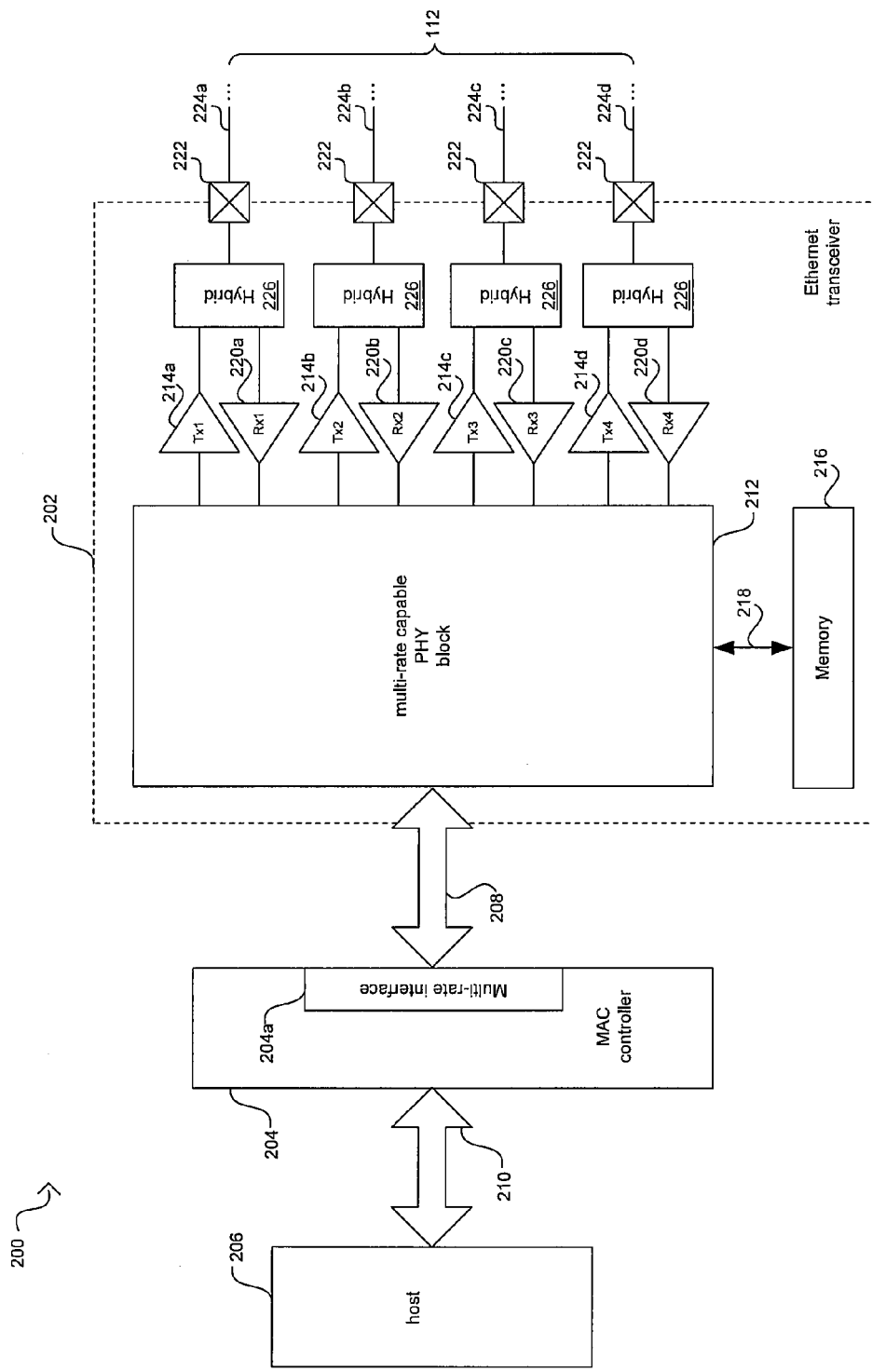
FIG. 2 is a block diagram illustrating an exemplary Ethernet over twisted pair PHY device architecture comprising a multi-rate physical block, in accordance with an embodiment of the invention.

FIG. 2 is a block diagram illustrating an exemplary Ethernet over twisted pair PHY device architecture comprising a multi-rate physical block, in accordance with an embodiment of the invention. Referring to FIG. 2, there is shown a link partner 200 which may comprises an Ethernet over twisted pair PHY device 202, a MAC controller 204, a host 206, an interface 208, and a bus controller interface 210. The PHY device 202 may be an integrated device which may comprise a multi-rate capable physical layer block 212, one or more transmitters 214, one or more receivers 220, a memory 216, a memory interface 218, and one or more input/output interfaces 222.

The PHY device 202 may be an integrated device that comprises a multi-rate capable physical layer block 212, one or more transmitters 214, one or more receivers 220, a memory 216, a memory interface 218, and one or more input/output interfaces 222. The operation of the PHY device 202 may be the same as or substantially similar to that of the PHY devices 110*a* and 110*b* disclosed in FIG. 1. In this regard, the PHY device 202 may provide layer 1 (physical layer) operability and/or functionality that enables communication with a remote PHY device. Similarly, the operation of the MAC controller 204, the host 206, the interface 208, and the bus controller 210 may be the same as or substantially similar to the respective MAC controllers 108*a* and 108*b*, hosts 106*a* and 106*b*, interfaces 114*a* and 114*b*, and bus controller interfaces 116*a* and 116*b* as described in FIG. 1. The MAC controller 204 may comprise a multi-rate interface 204*a* that may comprise suitable logic, circuitry, and/or code to enable communication with the PHY device 202 at a plurality of data rates via the interface 208.

The multi-rate capable physical layer block 212 in the PHY device 202 may comprise suitable logic, circuitry, and/or code that may enable operability and/or functionality of physical layer requirements. In this regard, the multi-rate capable physical layer block 212 may enable generating the appropriate link discovery signaling utilized for establishing communication with a remote PHY device in a remote link partner. The multi-rate capable physical layer block 212 may communicate with the MAC controller 204 via the interface 208. In one aspect of the invention, the interface 208 may be a media independent interface (MII) and may be configured to utilize a plurality of serial data lanes for receiving data from the multi-rate capable physical layer block 212 and/or for transmitting data to the multi-rate capable physical layer block 212. The multi-rate capable physical layer block 212 may be configured to operate in one or more of a plurality of communication modes, where each communication mode may implement a different communication protocol. These communication modes may include, but are not limited to, Ethernet over twisted pair standards 10BASE-T, 100BASE-TX, 1000BASE-T, 10GBASE-T, and other similar protocols that utilize multiple physical channels between link partners. The multi-rate capable physical layer block 212 may be configured to operate in a particular mode of operation upon initialization or during operation. For example, auto-negotiation may utilize the FLP bursts to establish a rate (e.g. 10Mbps, 100Mbps, 1000Mbps, or 10Gbps) and mode (half-duplex or full-duplex) for transmitting information.

The multi-rate capable physical layer block 212 may be coupled to memory 216 through the memory interface 218, which may be implemented as a serial interface or a bus. The memory 216 may comprise suitable logic, circuitry, and/or code that may enable storage or programming of information that includes parameters and/or code that may effectuate the operation of the multi-rate capable physical layer block 212. The parameters may comprise configuration data and the code may comprise operational code such as software and/or firmware, but the information need not be limited in this regard. Moreover, the parameters may include adaptive filter and/or block coefficients for use, for example, by the multi-rate capable physical layer block 212 and/or the hybrids 226.

Each of the transmitters 214a, 214b, 214c, 214d may comprise suitable logic, circuitry, and/or code that may enable transmission of data from the link partner 200 to a remote link partner via, for example, the cable 112 in FIG. 1. The receivers 220a, 220b, 220c, 220d may comprise suitable logic, circuitry, and/or code that may enable receiving data from a remote link partner. Each of the transmitters 214a, 214b, 214c, 214d and receivers 220a, 220b, 220c, 220d in the PHY device 202 may correspond to a physical channel that may comprise the cable 112. In this manner, a transmitter/receiver pair may interface with each of the physical channels 224a, 224b, 224c, 224d. In this regard, the transmitter/receiver pairs may be enabled to provide the appropriate communication rate and mode for each physical channel.

The input/output interfaces 222 may comprise suitable logic circuitry, and/or code that may enable the PHY device 202 to impress signal information onto a physical channel, for example a twisted pair of the cable 112 disclosed in FIG. 1. Consequently, the input/output interfaces 222 may, for example, provide conversion between differential and single-ended, balanced and unbalanced, signaling methods. In this regard, the conversion may depend on the signaling method utilized by the transmitter 214, the receiver 220, and the type of physical channel. Accordingly, the input/output interfaces 222 may comprise one or more baluns and/or transformers and may, for example, enable transmission over a twisted pair. Additionally, the input/output interfaces 222 may be internal or external to the PHY device 202. In this regard, if the PHY device 202 comprises an integrated circuit, then "internal" may, for example, refer to being "on-chip" and/or sharing the same substrate. Similarly, if the PHY device 202 comprises one or more discrete components, then "internal" may, for example, refer to being on the same printed circuit board or being within a common physical package.

In operation, the PHY device 202 may be enabled to transmit and receive simultaneously over up to four or more physical links. Accordingly, the link partner 200 may comprise a number of hybrids 226 corresponding to the number of physical links. Each hybrid 226 may comprise suitable logic, circuitry, and/or code that may enable separating transmitted and received signals from a physical link. For example, the hybrids may comprise echo cancellers, far-end crosstalk (FEXT) cancellers, and/or near-end crosstalk (NEXT) cancellers. Each hybrid 226 in the local link partner 300 may be communicatively coupled to an input/output interface 222.

In various embodiments of the invention, the link partner 200 may control a data rate at which it communicates over the 112 by controlling the inter-packet gap (IPG). In this regard, the link partner 200 may increase the IPG to reduce the data rate and may decrease the IPG to increase the data rate. For example, the node 200 may adjust the IPG such that data may be communicated at a standard rate over one or more of the physical channels 224a-224d. In this regard, data arriving at a standard rate may simplify operation of the link partner 200 and/or compatibility with other link partners which may be, for example, legacy devices.

In an exemplary embodiment of the invention, although the PHY device 202 may be enabled to handle non-standard data rates, higher layers of the link partner 200, such as the MAC controller 204, may require data to be passed to/from the PHY device 202 at a standardized rate. For example, in a 10GBASE-T network, reducing the link 112 to a single active channel 224a may result in communications over the link 112 at 2.5 Gbps. However, the host 206 may only be enabled to exchange data over the interface 210 at standardized rates of 100 Mbps, 1Gbps, and 10 Gbps. Accordingly, the IPG on channel 224a may be increased to bring the data rate on channel 224a down to 1 Gbps.

In various exemplary embodiments of the invention, different inter-packet gaps may be differently adjusted such that a desired average data rate is achieved. For example, the inter-packet gap may be periodically adjusted such that every other inter-packet gap may be of a first duration while the remaining inter-packet gaps may be of a second duration. Other means of varying or controlling duration of the inter-packet gap may be carried out without departing from the scope of the invention.

Figure 3:
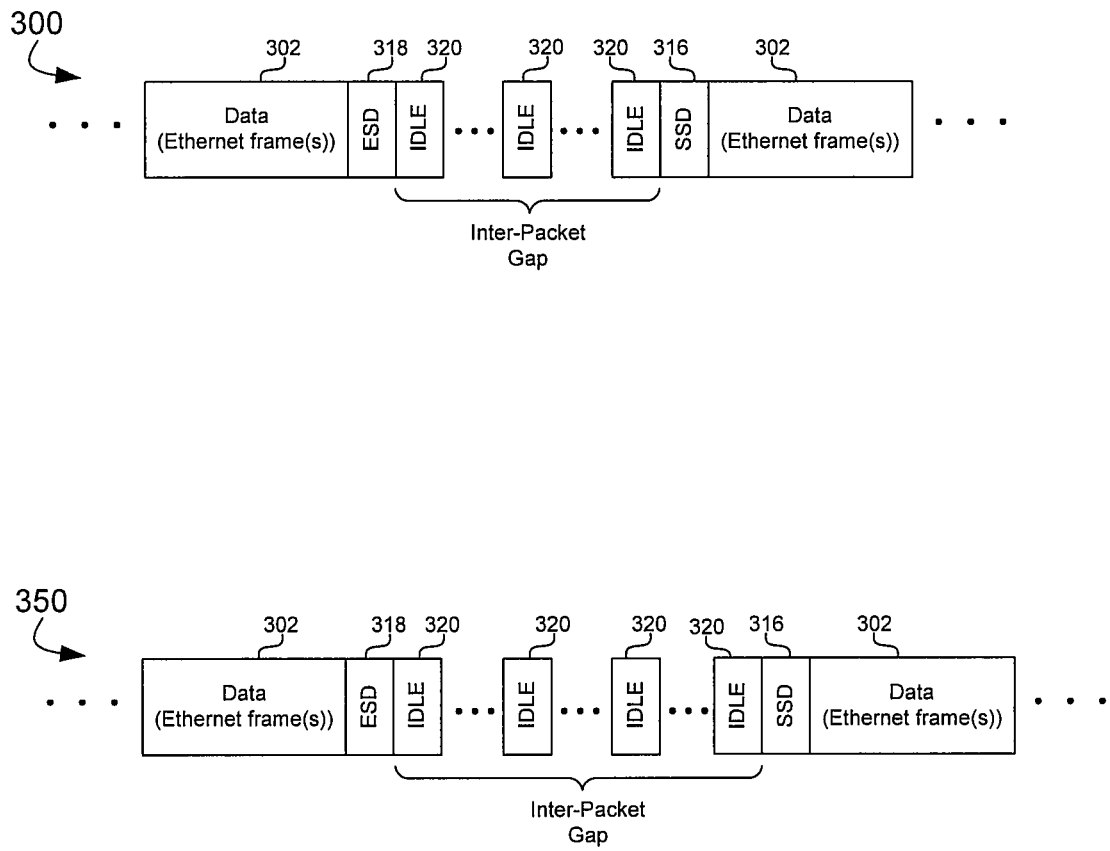
FIG. 3 is a diagram illustrating adjusting inter-packet gap to control data rates on an Ethernet link, in accordance with an embodiment of the invention.

FIG. 3 is a diagram illustrating adjusting inter-packet gap to control data rates on an Ethernet link, in accordance with an embodiment of the invention. Referring to FIG. 3, there is shown two exemplary periods of activity on an Ethernet channel. In this regard, the inter-packet gap occurring during period of activity 300 may be shorter than the inter-packet gap occurring during period 350. Accordingly, the data rate during period 300 may be higher than the data rate during period 350. In this manner, aspects of the invention may enable altering a communication rate over an Ethernet link by adjusting the inter-packet gap.

The effect of the IPG on the overall data rate may depend on the data being transmitted on the link. For example, if maximum sized Ethernet packets are transmitted, the IPG may represent a smaller percentage of a given time interval, whereas if minimum sized Ethernet packets are transmitted then the IPG may represents a greater percentage of the time interval. Accordingly, past, present, and/or predicted packet sizes and/or patterns on a link may be taken into account when adjusting the IPG such that a desired effect on the overall data rate of the link may be achieved.

In an exemplary embodiment of the invention, a subset PHY may control the number of physical channels over which data is communicated between two nodes. However, when one or more physical channels are turned off, a data rate over an Ethernet link may be a non-standardized rate. Accordingly, in instances when a standardized data rate is desired, the inter-packet gap time may be adjusted such that data is communicated at a standardized rate.

In an exemplary embodiment of the invention, a link may carry media, such as an audio and/or video stream, which may have a known and/or distinct traffic pattern. Accordingly, the IPG may be adjusted to match the data rate on the link to the traffic pattern. For example, the stream may have a fixed, or nearly fixed, data rate and the IPG on the link may be adjusted such that the data rate of the link may match the data rate of the media.

In various embodiments of the invention, the IDLE symbols 320 depicted in FIG. 3 may be standard IDLE symbols. In various embodiments of the invention, proprietary and/or low-energy link pulses which may be utilized to maintain training parameters on the link may be transmitted by the physical device 202 during IPG. In such instances, a link and/or one or more channels on the link may be silent and/or convey non-conventional IDLE symbols during the inter-packet gap.

Figure 4:
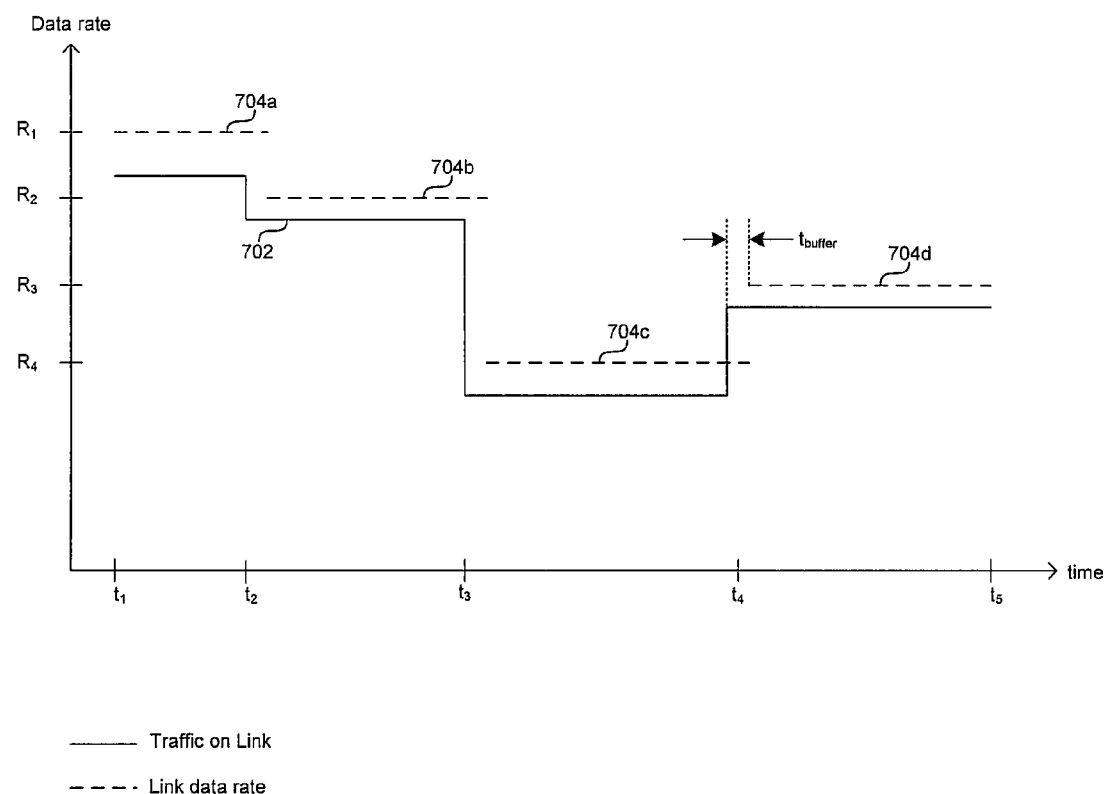
FIG. 4 is a diagram illustrating data rate transitions on a network link with configurable data rate thresholds, in accordance with an embodiment of the invention.

FIG. 4 is a diagram illustrating data rate transitions on a network link with adjustable inter-packet gap, in accordance with an embodiment of the invention. Referring to FIG. 7 waveform 702 may indicate the traffic on a network link during the time interval from $t_1$ to $t_5$, and waveforms 704a, 704b, 704c, 704d may, respectively, indicate the maximum data rate of the link during the time intervals $t_1$ to $t_2$, $t_2$ to $t_3$, $t_3$ to $t_4$, and $t_4$ to $t_5$.

Aspects of the invention may enable adjusting the maximum data rate of a network based on traffic on the link during a time interval. In this regard, the data rate of a network link may be reduced by controlling a variety of data rate factors. For example, controllable data rate factors may comprise turning on/off one or more physical channels comprising the link, altering a the number of levels utilized for signaling, altering a signal constellation utilized for representing signals on the link, and/or adjusting the inter-packet gap time on the link.

In the exemplary embodiment depicted, during time interval $t_1$-$t_2$, the traffic on the link may be greater than the threshold $R_2$ but less than the threshold $R_1$. Accordingly, during $t_1$-$t_2$, the link may operate a data rate of $R_1$. However, at time $t_2$, the traffic on the network may fall below the threshold $R_2$. Consequently, aspects of the invention may enable reducing energy consumption by reducing the data rate to $R_2$. In this regard, the data rate may be reduced to $R_2$ by turning off one or more physical channels comprising the link, altering signal levels, altering the signal constellation, and/or adjusting the inter-packet gap time. At time $t_3$, the traffic on the network may decrease further and may fall below the threshold $R_4$. Consequently, aspects of the invention may enable reducing energy consumption by reducing the data rate to $R_4$.

At time $t_4$, the traffic on the network may increase. Consequently, the data rate $R_4$ may be insufficient to handle the traffic on the link. Accordingly, aspects of the invention may enable increasing the data rate to $R_3$. In this regard, during the time interval $t_{buffer}$ from when the traffic increases above $R_4$ to when the system changes the data rate to $R_3$, there is a possibility of dropped and/or corrupted packets. Accordingly, aspects of the invention may enable buffering data until the switch from a lower data rate to a higher data rate occurs. Moreover, aspects of the invention may enable predicting increases in network traffic based on, for example, past network statistics, characteristics of data being transmitted, time of day, applications running on a node connected to the link, or other factors. In this manner, the data rate may be increased prior to a loss or corruption of data.

Figure 5:
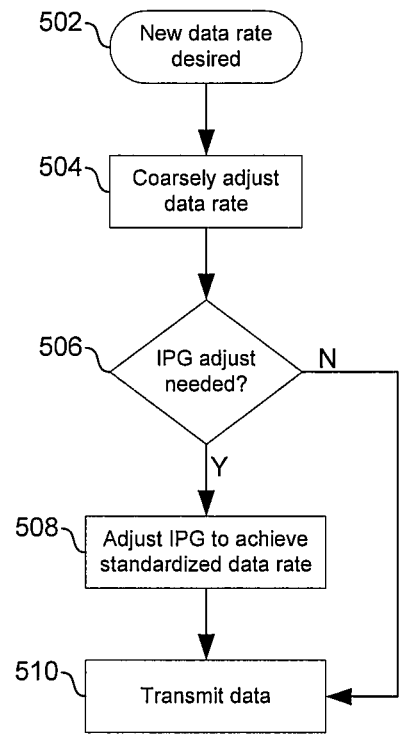
FIG. 5 is a flow chart illustrating exemplary steps utilizing IPG adjustment to finely adjust a data rate of a network link, in accordance with an embodiment of the invention.

FIG. 5 is a flow chart illustrating exemplary steps utilizing IPG adjustment to finely adjust a data rate of a network link, in accordance with an embodiment of the invention. In this regard, FIG. 5 illustrates only an exemplary embodiment of the invention wherein IPG adjustment is utilized in conjunction with other techniques of controlling a data rate on a network link. However, in various other embodiments of the invention, IPG adjustment may be the only technique utilized to control a data rate on a network link. Additionally and/or alternatively, IPG adjustment may be utilized in conjunction with low power idle techniques to improve energy efficiency of a network. For example, low power and/or proprietary IDLE symbols and/or energy transmissions may be conveyed on a network link during one or more IPGs that have been extended and/or shortened in accordance with an embodiment of the invention.

Referring to FIG. 5, the exemplary steps may begin with step 502 when a link partner communicatively coupled to a network link may desire to transition to a different data rate. Subsequent to step 502, the exemplary steps may advance to step 504. In step 504, the data rate may be adjusted via a variety of techniques. For example, the link partner may comprise a subset PHY that may be enabled to vary the number of channels over which it communicates. Additionally and/or alternatively, the link partner may control the data rate via other techniques such as altering a signal constellation utilized for representing data on the link and/or a altering a symbol rate on the link. However, techniques such as these may provide only a course control of the data rate and a finer adjustment may be desired. For example, altering the number of channels may result in data communications at a non-standardized data rate which may not be supported by higher layer functions, such as a MAC controller. Alternatively, although non-standardized data rates may be support by higher layer functions, certain desirable data rates, such as 2.5 Gbps and 5 Gbps, may be more easily accommodated and/or yield improved energy efficiency. Accordingly, subsequent to step 504, the exemplary steps may advance to step 506. In step 506, it may be determined whether IPG adjustment is required to achieve a standardized data rate. In instances that IPG adjustment may be necessary, the exemplary steps may advance to step 508. In step 508, one or more IPGs may be adjusted to achieve the desired standardized data rate. Subsequent to step 500, the exemplary steps may advance to step 510. In step 510, data may be communicated onto the link with the inter-packet gaps as determined in step 508.

Returning to step 506, in instances that a standardized rate may not be required and/or IPG adjustment may not be needed to achieve a desired data rate, the exemplary steps may advance to step 510. In step 510, data may be transmitted onto the link with standard inter-packet gaps.

Aspects of a method and system for programmable data rate thresholds for configurable data rate via inter-packet gap adjustment to support energy efficient networks. In this regard, an inter-packet gap may be adjusted to control a data rate on an Ethernet link. An IPG may be adjusted such that a data rate on a network link may be communicated at a non-standardized rate suited, for example, to an audio and/or video stream. An IPG may be adjusted such that data is communicated over the link at a standardized rate. In this regard, adjusting the IPG may compensate for a non-standardized data rate resulting from altering a number of active channels in the link and/or altering a signal constellation utilized on the link. The IPG may be adjusted based on a control policy which may govern data rates on a network link. For example, the IPG may be adjusted based on past, present, and/or expected traffic on the link; based on a type of traffic on the link; and/or based on an application associated with the traffic on the link. Each of a plurality of inter-packet gaps may be differently adjusted to achieve a desired average data rate on the link.

Another embodiment of the invention may provide a machine-readable storage, having stored thereon, a computer program having at least one code section executable by a machine, thereby causing the machine to perform the steps as described herein for configurable data rate via inter-packet gap adjustment.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for networking, the method comprising:
   in an Ethernet PHY which communicates Ethernet physical layer signals over an Ethernet link comprising a plurality of twisted pairs:
      coarsely controlling a data rate on said Ethernet link by adjusting how many wires of said plurality of twisted pairs are utilized by said Ethernet PHY for communicating said Ethernet physical layer signals, wherein:
         said Ethernet PHY communicates said Ethernet physical layer signals over a first number of said wires of said plurality of twisted pairs before said adjusting;
         said Ethernet PHY communicates said Ethernet physical layer signals over a second number of said wires of said plurality of twisted pairs after said adjusting; and
         said first number is different than said second number; and
      finely controlling said data rate on said Ethernet link by adjusting inter-packet gap between packets communicated by said Ethernet PHY over said Ethernet link, wherein energy consumption is reduced through an increase of said inter-packet gap and energy consumption is increased through a decrease of said inter-packet gap.

2. The method according to claim 1, comprising adjusting said inter-packet gap such that data on said Ethernet link is communicated at a non-standardized rate based on a data rate of media communicated over said link.

3. The method according to claim 1, comprising, in instances that adjusting a parameter results in a non-standardized rate on said Ethernet link, adjusting said inter-packet gap such that data on said Ethernet link is communicated at a standardized rate.

4. The method according to claim 1, comprising adjusting said inter-packet gap such that data is communicated over said plurality of utilized twisted pairs at a standardized rate.

5. The method according to claim 1, comprising adjusting a data rate on said Ethernet link by adjusting a signal constellation utilized on said Ethernet link and adjusting said inter-packet gap such that data is communicated over said Ethernet link at a standardized rate utilizing said adjusted signal constellation.

6. The method according to claim 1, comprising adjusting said inter-packet gap based on past traffic and/or expected traffic on said Ethernet link.

7. The method according to claim 1, comprising adjusting said inter-packet gap for a sequence of Ethernet packets based on a type of traffic carried by said sequence of Ethernet packets.

8. The method according to claim 1, comprising adjusting said inter-packet gap for a sequence of Ethernet packets based on an application running on a network device and associated with said sequence of packets.

9. The method according to claim 1, comprising differently adjusting each of a plurality of inter-packet gaps to achieve a desired average data rate on said Ethernet link.

10. A non-transitory machine-readable storage having stored thereon, a computer program having at least one code section for communications, the at least one code section being executable by a machine for causing the machine to perform steps comprising:
    in an Ethernet PHY which communicates Ethernet physical layer signals over an Ethernet link comprising a plurality of twisted pairs:
       coarsely controlling a data rate on said Ethernet link by adjusting how many twisted pairs of said plurality of twisted pairs are utilized by said Ethernet PHY for communicating said Ethernet physical layer signals, wherein:
          said Ethernet PHY communicates said Ethernet physical layer signals over a first number of said wires of said plurality of twisted pairs before said adjusting;
          said Ethernet PHY communicates said Ethernet physical layer signals over a second number of said wires of said plurality of twisted pairs after said adjusting; and
          said first number is different than said second number; and
       finely controlling said data rate on said Ethernet link by adjusting inter-packet gap between packets communicated by said Ethernet PHY over said Ethernet link, wherein energy consumption is reduced through an increase of said inter-packet gap and energy consumption is increased through a decrease of said inter-packet gap.

11. The non-transitory machine-readable storage according to claim 10, wherein said at least one code section comprises code for adjusting said inter-packet gap such that data on said Ethernet link is communicated at a non-standardized rate based on a data rate of media communicated over said link.

12. The non-transitory machine-readable storage according to claim 10, wherein said at least one code section comprises code for, in instances that adjusting a parameter results in a non-standardized rate on said Ethernet link, adjusting said inter- packet gap such that data on said link is communicated at a standardized rate.

13. The non-transitory machine-readable storage according to claim 10, wherein said at least one code section comprises code for adjusting said inter-packet gap such that data is communicated over said plurality of utilized twisted pairs at a standardized rate.

14. The non-transitory machine-readable storage according to claim 10, wherein said at least one code section comprises code for adjusting a data rate on said Ethernet link by adjusting a signal constellation utilized on said Ethernet link and adjusting said inter-packet gap such that data is communicated over said Ethernet link at a standardized rate utilizing said adjusted signal constellation.

15. The non-transitory machine-readable storage according to claim 10, wherein said at least one code section comprises code for adjusting said inter-packet gap based on past and/or expected traffic on said Ethernet link.

16. The non-transitory machine-readable storage according to claim 10, wherein said at least one code section comprises code for adjusting said inter-packet gap for a sequence of Ethernet packets based on a type of traffic carried by said sequence of Ethernet packets.

17. The non-transitory machine-readable storage according to claim 10, wherein said at least one code section comprises code for adjusting said inter-packet gap for a sequence of Ethernet packets based on an application running on a network device and associated with said sequence of packets.

18. The non-transitory machine-readable storage according to claim 10, wherein said at least one code section comprises code for differently adjusting each of a plurality of inter-packet gaps to achieve a desired average data rate on said Ethernet link.

19. A system for networking, the system comprising:
one or more circuits for use in an Ethernet PHY, wherein said one or more circuits enable:
communication of Ethernet physical layer signals over an Ethernet link comprising a plurality of twisted pairs;
coarsely controlling a data rate on said Ethernet link by adjusting how many twisted pairs of said plurality of twisted pairs are utilized by said Ethernet PHY for communicating said Ethernet physical layer signals, wherein:
said Ethernet PHY communicates said Ethernet physical layer signals over a first number of said wires of said plurality of twisted pairs before said adjusting;
said Ethernet PHY communicates said Ethernet physical layer signals over a second number of said wires of said plurality of twisted pairs after said adjusting; and
said first number is different than said second number; and
finely controlling said data rate on said Ethernet link by adjusting inter-packet gap between packets communicated by said Ethernet PHY over said Ethernet link, wherein energy consumption is reduced through an increase of said inter-packet gap and energy consumption is increased through a decrease of said inter-packet gap.

20. The system according to claim 19, wherein said one or more circuits enable adjustment of said inter-packet gap such that data on said Ethernet link is communicated at a non-standardized rate based on a data rate of media communicated over said link.

21. The system according to claim 19, wherein said one or more circuits enable, in instances that adjusting a parameter other than inter-packet gap results in a non-standardized rate on said Ethernet link, adjustment of said inter-packet gap such that data on said Ethernet link is communicated at a standardized rate.

22. The system according to claim 19, wherein said one or more circuits enable adjusting said inter-packet gap such that data is communicated over said plurality of utilized twisted pairs at a standardized rate.

23. The system according to claim 19, wherein said one or more circuits enable adjustment of a data rate on said Ethernet link by adjusting a signal constellation utilized on said Ethernet link and adjusting said inter-packet gap such that data is communicated over said Ethernet link at a standardized rate utilizing said adjusted signal constellation.

24. The system according to claim 19, wherein said one or more circuits enable adjustment of said inter-packet gap based on past and/or expected traffic on said Ethernet link.

25. The system according to claim 19, wherein said one or more circuits enable adjustment of said inter-packet gap for a sequence of Ethernet packets based on a type of traffic carried by said sequence of Ethernet packets.

26. The system according to claim 19, wherein said one or more circuits enable adjustment of said inter-packet gap for a sequence of Ethernet packets based on an application running on a network device and associated with said sequence of packets.

27. The system according to claim 19, wherein said one or more circuits enable different adjustment of each of a plurality of inter-packet gaps to achieve a desired average data rate on said Ethernet link.

* * * * *